United States Patent
Ishitoko et al.

(10) Patent No.: US 6,680,559 B2
(45) Date of Patent: Jan. 20, 2004

(54) VIBRATION GYROSCOPE AND ELECTRONIC DEVICE USING THE SAME

(75) Inventors: Nobuyuki Ishitoko, Moriyama (JP); Katsumi Fujimoto, Toyama-ken (JP)

(73) Assignee: Murata Manufacturing Co., Ltd., Kyoto (JP)

(*) Notice: Subject to any disclaimer, the term of this patent is extended or adjusted under 35 U.S.C. 154(b) by 23 days.

(21) Appl. No.: 10/107,281

(22) Filed: Mar. 26, 2002

(65) Prior Publication Data

US 2002/0134155 A1 Sep. 26, 2002

(30) Foreign Application Priority Data

Mar. 26, 2001 (JP) ......................... 2001-088335

(51) Int. Cl.[7] .............................................. H01L 41/08
(52) U.S. Cl. ...................................................... 310/348
(58) Field of Search ................................ 310/348, 352; 73/504.14

(56) References Cited

U.S. PATENT DOCUMENTS

| | | | | |
|---|---|---|---|---|
| 4,027,181 A | * | 5/1977 | Moreillon et al. | 310/348 |
| 4,532,451 A | * | 7/1985 | Inoue | 310/353 |
| 5,889,358 A | * | 3/1999 | Mori et al. | 310/348 |
| 6,097,132 A | * | 8/2000 | Inoi et al. | 310/345 |
| 6,250,158 B1 | * | 6/2001 | Stewart | 73/504.14 |
| 2001/0015594 A1 | * | 8/2001 | Mori et al. | 310/330 |
| 2003/0101816 A1 | * | 6/2003 | Ishitoko | 73/504.14 |

FOREIGN PATENT DOCUMENTS

| | | | |
|---|---|---|---|
| JP | 6-331363 | 2/1994 | G01C/19/56 |
| JP | 6-201386 | 7/1994 | G01C/19/56 |
| JP | 7-208997 | 8/1995 | G01C/19/56 |
| JP | 8-159779 | 6/1996 | G01C/19/56 |
| JP | 9-159455 | 6/1997 | G01C/19/56 |

* cited by examiner

Primary Examiner—Thomas M. Dougherty
(74) Attorney, Agent, or Firm—Keating & Bennett, LLP

(57) ABSTRACT

A vibration gyroscope includes a vibrator base that supports a vibrator in a hollow portion of the base and includes a frame-shaped portion. Protrusion portions are provided on the inner wall of the frame-shaped portion which defines a stopper that restricts displacement of the vibrator beyond a desired distance. The frame-shaped portion and the protrusion portions are integrally formed by a two-color molding method to define a single unitary member.

20 Claims, 6 Drawing Sheets

VIBRATION GYROSCOPE AND ELECTRONIC DEVICE USING THE SAME

BACKGROUND OF THE INVENTION

1. Field of the Invention

The present invention relates to a vibration gyroscope and an electronic device including the vibration gyroscope.

2. Description of the Related Art

A pillar-shaped vibrator that performs bending vibration with both ends open, which is used in a vibration gyroscope, is supported such that the vicinity of the nodes is fixed to supporting members. Then, the needle-shaped supporting members are arranged such that the vibration of the vibrator is not disturbed.

When an external impact force is applied to a vibrator supported by such supporting members, although the vibrator is inclined to be displaced, the vibrator is supported by the elastically deformed supporting members. Therefore, after the impact force subsides, the supporting members return to their original state.

However, when the magnitude of the impact force exceeds a fixed value, the deformation of the supporting members exceeds the range of elastic deformation and plastic deformation takes place, and accordingly, after the impact force subsides, the supporting members do not return to their original state. Once plastic deformation of the supporting members occurs, the position of the vibrator changes and there is a problem that a normal angular velocity cannot be detected.

In order to avoid such a problem, a stopper has been provided for restricting displacement of the vibrator beyond a fixed distance due to an excessive impact force. The construction including a stopper is disclosed in Japanese Unexamined Patent Application Publication No. 6-201386, Japanese Unexamined Patent Application Publication No. 6-331363, Japanese Unexamined Patent Application Publication No. 7-208997, Japanese Unexamined Patent Application Publication No. 8-159779, and Japanese Unexamined Patent Application Publication No. 9-159455. That is, in each of the references cited above, a stopper is arranged so as to enclose both end portions of a pillar-shaped vibrator and, in this way, displacement of the vibrator beyond a fixed level is prevented and plastic deformation of the supporting members is prevented.

However, when the above-described stopper is provided, since the number of parts increases and the assembly time also increases in the manufacturing process, there is a problem that the cost of a vibration gyroscope greatly increases.

SUMMARY OF THE INVENTION

In order to overcome the above-described problems, preferred embodiments of the present invention provide a vibration gyroscope and an electronic device including the vibration gyroscope in which, although a stopper portion is provided, the cost of the vibration gyroscope is not substantially increased.

A vibration gyroscope according to preferred embodiments of the present invention includes a base having a hollow portion, supporting members fixed to the base, and a vibrator supported by the supporting members in the hollow portion of the base. The base includes a frame portion, and a stopper portion provided on the inner wall of the frame portion so as to limit displacement of the vibrator within a desired distance, and the frame portion and the stopper portion are integrally formed to define a single unitary member.

Furthermore, in a vibration gyroscope according to preferred embodiments of the present invention, the stopper portion is preferably defined by a thick wall portion or a protrusion portion provided on the inner wall of the frame portion of the base. The stopper portion is preferably elastic.

The frame portion and the stopper portion of the base are preferably formed by integrally molding two materials to define a single unitary member including the frame portion and the stopper portion.

Preferably, the vibration gyroscope according to preferred embodiments of the present invention further includes sandwiching members arranged above and below the hollow portion of the base to sandwich the base. The sandwiching members are preferably defined by a circuit substrate or a case and define a second stopper portion to limit displacement of the vibrator in the thickness direction of the base.

Furthermore, an electronic device according to preferred embodiments of the present invention includes the vibration gyroscope according to preferred embodiments described above.

With the vibration gyroscope according to preferred embodiments of the present invention, the plastic deformation of the supporting members and the damage of the vibrator caused by an impact force is effectively prevented while using fewer parts. Thus, the cost of manufacturing the vibration gyroscope is greatly reduced while the performance thereof is greatly improved.

Furthermore, in the electronic device according to preferred embodiments of the present invention, the reliability of detection of an angular velocity caused by an impact force is greatly improved.

The features, elements, characteristics and advantages of the present invention will be clear from the following detailed description of preferred embodiments of the invention in conjunction with the accompanying drawings.

DETAILED DESCRIPTION OF PREFERRED EMBODIMENTS

Figure 1:
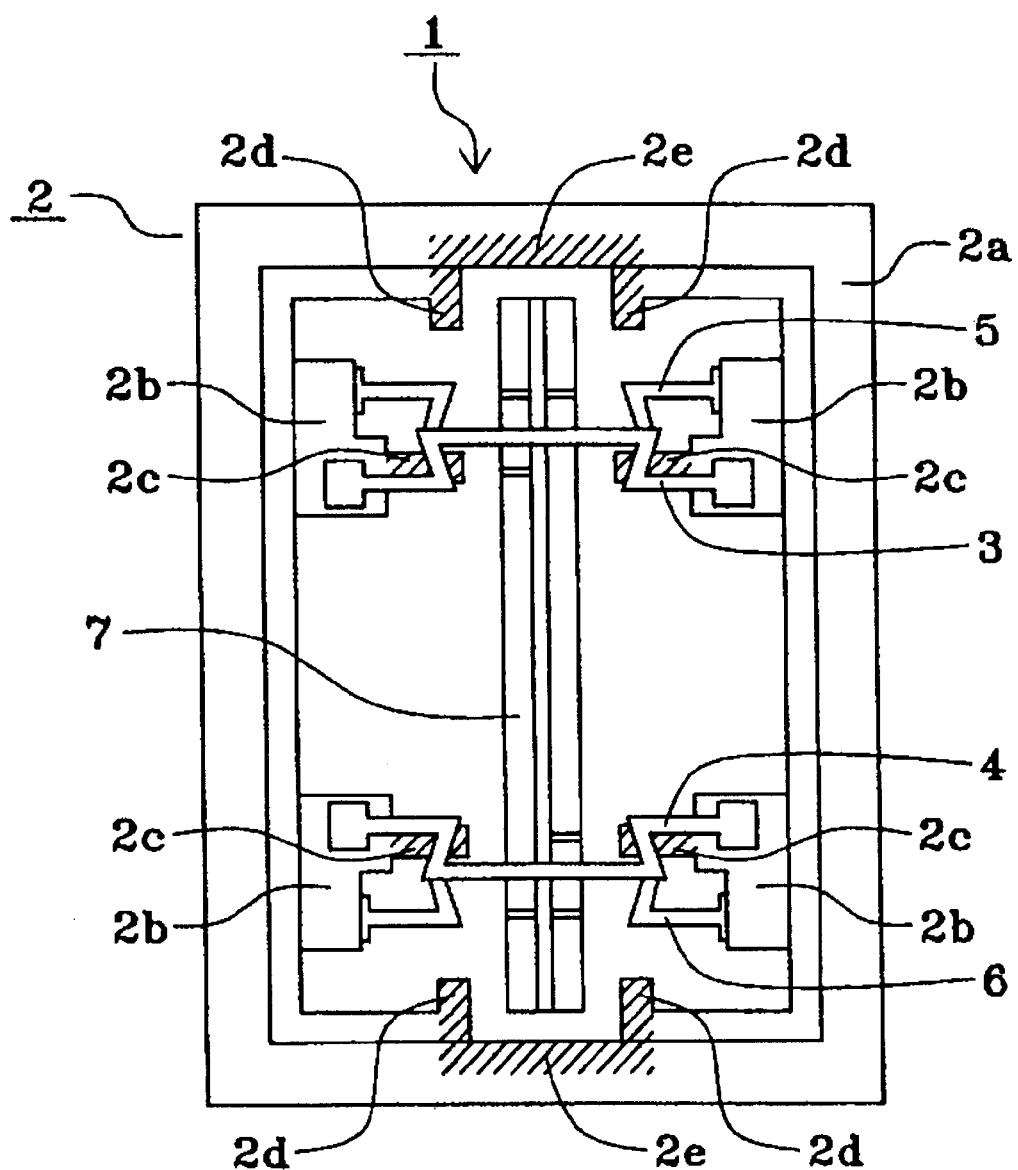
FIG. 1 is a top view showing one preferred embodiment of a vibration gyroscope according to the present invention.

FIG. 1 is a top view showing one preferred embodiment of a vibration gyroscope according to the present invention. In FIG. 1, the vibration gyroscope 1 includes a frame-shaped vibrator base 2, supporting members 3 to 6 fixed to the vibrator base 2, and a substantially pillar-shaped vibrator 7 supported by the supporting members 3 to 6 in a hollow portion of the vibrator base 2. Additionally, the vibration gyroscope 1 includes a circuit board provided with a driving circuit for driving the vibrator 7, a detection circuit for detecting Coriolis force, a case housing the vibrator 7, however these elements are not illustrated.

Figure 2:
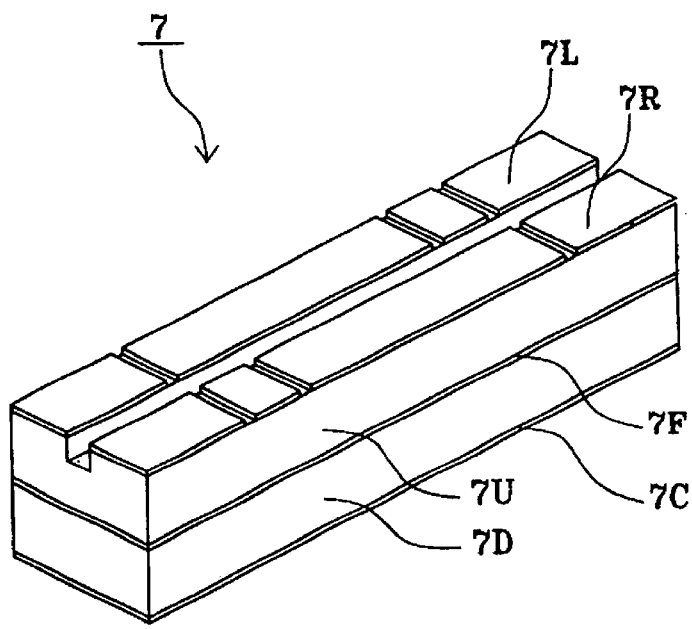
FIG. 2 is a perspective view showing the vibrator of the vibration gyroscope in FIG. 1.

FIG. 2 is a perspective view showing the vibrator 7. As shown in FIG. 2, the vibrator 7 is configured such that a piezoelectric substrate 7U which is polarized in the thickness direction thereof and on one main surface of which split electrodes 7L and 7R are provided and a piezoelectric substrate 7D which is polarized in the thickness direction thereof and on one main surface of which a common electrode 7C is provided are laminated together via an intermediate electrode 7F so as to have polarization directions that are opposite to each other and have the other main surfaces laminated together. The split electrodes 7L and 7R are separated in the width direction.

Figure 3:
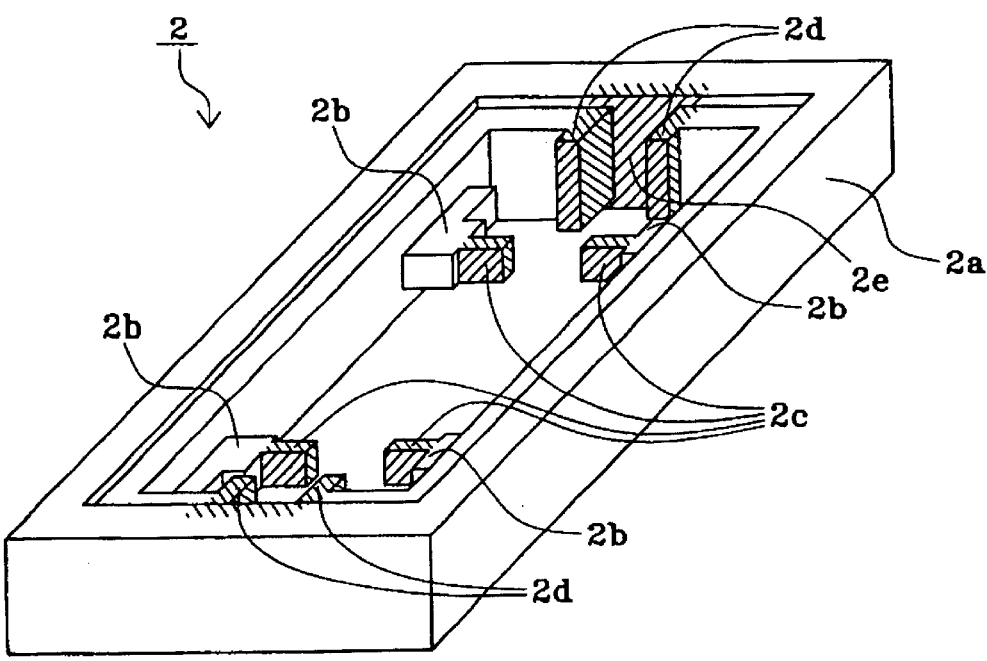
FIG. 3 is a perspective view showing the vibrator base of the vibration gyroscope in FIG. 1.

FIG. 3 is a perspective view showing the vibration base 2. As shown in FIG. 3, the vibrator base 2 includes a frame-shaped portion 2a, a plurality of fixing bases 2b for fixing supporting members which are provided in the frame-shaped portion 2a, a plurality of protrusion portions 2c provided in the fixing bases 2b, respectively, and a plurality of protrusion portions 2d provided in the frame-shaped portion 2a in the vicinity of each end portion of the vibrator. The frame-shaped portion 2a, fixing bases 2b, and protrusion portions 2c and 2d defining the vibrator base 2 are integrally formed so as to define a single unitary member. In particular, different resin materials are preferably used for the frame-shape portion 2a and fixing bases 2b and the protrusion portions 2c and 2d, and are integrally formed by a two-color integral molding method to define the single unitary member. Among these, an elastic material is preferably used for the protrusion portions 2c and 2d. Furthermore, the same material as that of the protrusion portions 2c and 2d is partially used in a fixed thickness in narrow portions 2e sandwiched between the two protrusions 2d on the inner wall of the frame-shaped portion 2a.

In FIG. 1, the supporting members 3 and 4 are fixed such that both end portions of the supporting members 3 and 4 are attached to the fixing bases 2b. Furthermore, the supporting members 5 and 6 are arranged such that both end portions of the supporting members 5 and 6 are embedded in the fixing bases 2b. Then, the middle portion of the supporting members 3 and 5 is fixed to the upper and lower portions of one node of the vibrator 7, respectively, such that the one node of the vibrator 7 is sandwiched therebetween. Furthermore, the middle portion of the supporting members 4 and 6 is fixed to the upper and lower portions of the other node of the vibrator 7, respectively, such that the other node of the vibrator 7 is sandwiched therebetween.

In the vibration gyroscope 1, the vibrator 7 performs bending vibration with both ends open in the thickness direction (the same as the thickness direction of the piezoelectric substrates 7U and 7D) in accordance with a driving signal. When an angular velocity having a rotating axis in the length direction of the vibrator 7 (the same as the length direction of the piezoelectric substrates 7U and 7D) is applied to the vibrator 7, vibration is generated in the width direction (same as the width direction of the piezoelectric substrates 7U and 7D) due to Coriolis force. Because signals of opposite polarity to each other which are proportional to the vibration in the width direction (that is, in proportion to Coriolis force) are output from the split electrodes 7L and 7R, the angular velocity applied to the vibration gyroscope 1 is detected by measuring the outputs.

In the vibration gyroscope 1, when a large impact force is applied from the left and right directions in FIG. 1, the vibrator 7 is displaced in the left and right directions, but excessive displacement of the vibrator 7 is limited by the protrusion portions 2c and 2d. That is, the protrusion portions 2c and 2d define a stopper portion for the vibrator 7. Moreover, since an elastic material is used for the protrusion portions 2c and 2d, the vibrator 7 is not damaged even if the vibrator 7 strikes the protrusion portions 2c and 2d. Therefore, plastic deformation of the supporting members 3, 4, 5, and 6 which support the vibrator 7 is prevented, and when the impact force subsides, the vibrator 7 and the supporting members 3, 4, 5, and 6 return to their original respective states.

Furthermore, when a large impact force is applied from the top and bottom directions in FIG. 1, the vibrator is displaced in the top and bottom directions, but excessive displacement is limited such that the end portions strike on the narrow portions 2e sandwiched between the two protrusion portions 2d in the frame-shaped portion 2a. That is, the narrow portions sandwiched between the two protrusions 2d inside the frame-shaped portion 2a define a stopper portion for the vibrator 7. Moreover, since an elastic material is used for the narrow portions on which the end portions of the vibrator 7 strike, the vibrator 7 is not damaged even if the vibrator 7 strikes the narrow portions 2e. Therefore, plastic deformation of the supporting members 3, 4, 5, and 6 which support the vibrator 7 is prevented, and when the impact force subsides, the vibrator 7 and the supporting members 3, 4, 5, and 6 return to their original state.

Thus, in the vibration gyroscope 1, by limiting displacement of the vibrator 7 caused by a large impact force, plastic deformation of the supporting members 3, 4, 5, and 6 is prevented, and damage to the vibrator 7 is prevented and the ability of the vibration gyroscope 1 to withstand an impact force is greatly improved. Moreover, since the vibrator base 2 itself defines the stopper, it is not necessary to provide a separate stopper, and accordingly, the cost and size of the vibration gyroscope is greatly reduced by reducing the number of parts. Furthermore, since the number of parts is reduced, the number of man-hours required for assembly is also reduced in the manufacturing process and the manufacturing cost is greatly reduced.

Figure 4:
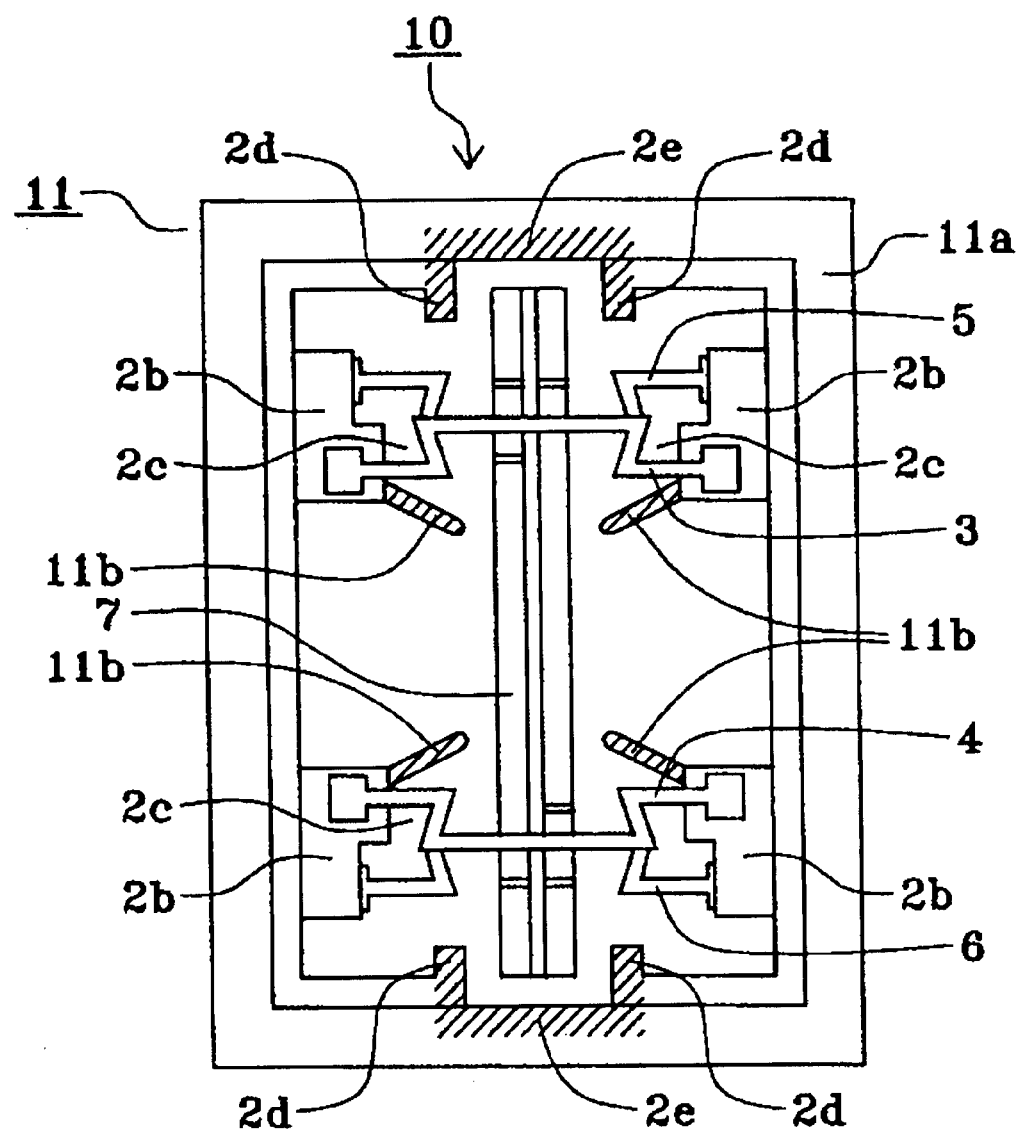
FIG. 4 is a top view showing another preferred embodiment of a vibration gyroscope according to the present invention.

FIG. 4 is a top view showing another preferred embodiment of a vibration gyroscope according to the present invention. In FIG. 4, the same reference numerals are used for the same or equivalent parts as that in FIG. 1, and the description thereof is omitted.

In FIG. 4, the vibration gyroscope 10 is provided with a vibrator base 11 in which a plurality of protrusion portions 11b are provided instead of the plurality of protrusion portions 2c of the vibrator base 2 in the vibration gyroscope 1. In the vibrator base 11, the protrusion portions 11b protrude from the side surface of the vibrator 7 in a direction that is not perpendicular to the side surface of the vibrator 7 and defines a stopper portion for the vibrator 7. Therefore, the protrusion portions 11b provide a fixed spring action due to their shape in addition to the elasticity provided by the elastic material. Moreover, the same resin material used for the protrusion portions 2d is used for the protrusion portions 11b, and the protrusion portions 11b are preferably integrally formed with the vibrator base 11 by a two-color integral molding method to define a single unitary member as in the case of the vibrator base 2.

In the vibration gyroscope 10, since the protrusion portions 11b of the vibrator base 11 are located in the vicinity of the side surface of the vibrator 7 so as to have a fixed angle that is not perpendicular to the side surface of the vibrator 7, when the vibrator 7 strikes the protrusion portions 11b due to an external impact, the force of the impact between the vibrator 7 and the protrusion portions 11b is reduced by the protrusion portions 11b being bent in the width direction of the vibrator 7. Therefore, the possibility of the vibrator 7 being damaged by the protrusion portions 11b is further reduced.

Figure 5:
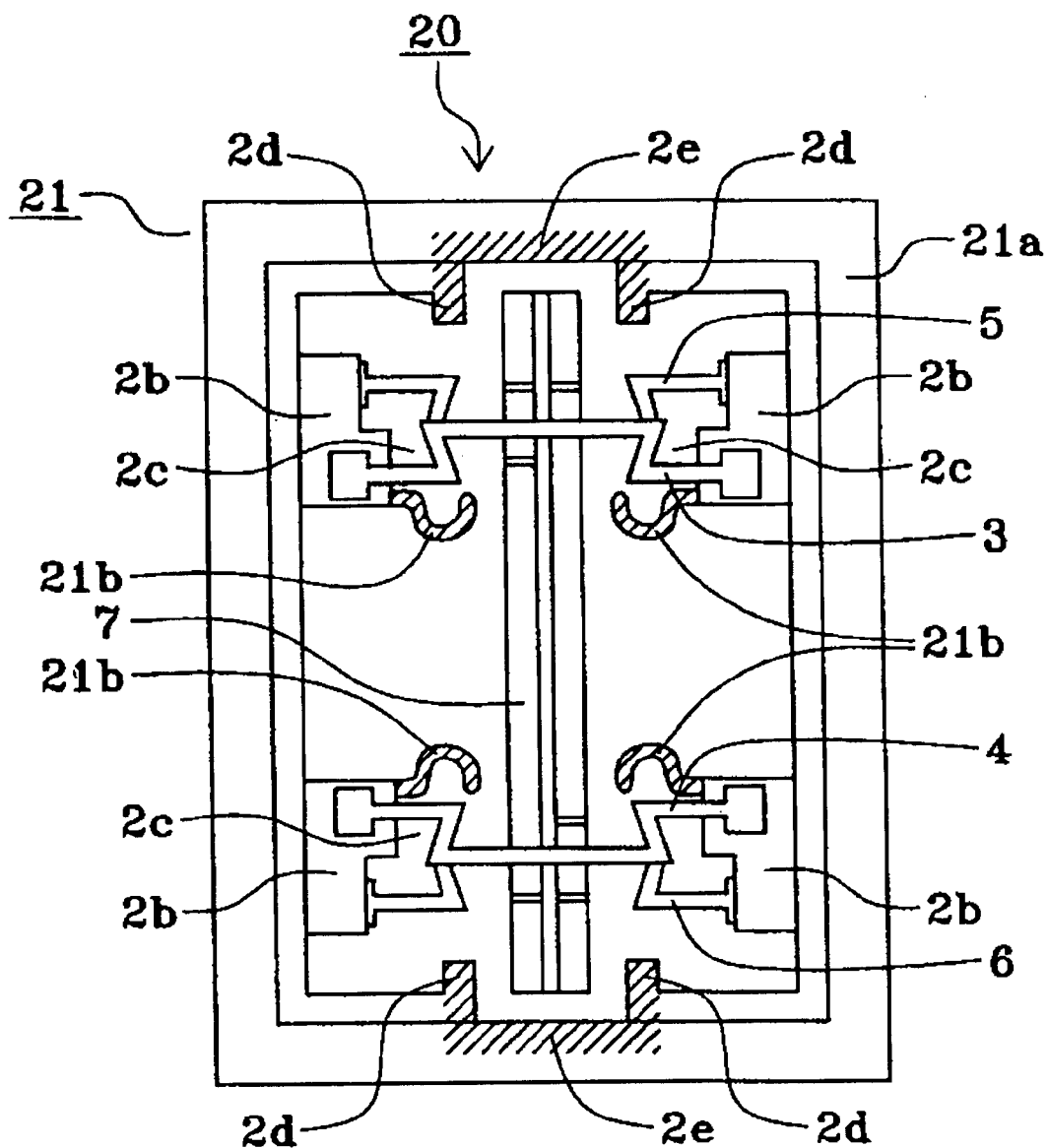
FIG. 5 is a top view showing still another preferred embodiment of a vibration gyroscope according to the present invention.

FIG. 5 is a top view showing further another preferred embodiment of a vibration gyroscope according to the present invention. In FIG. 5, the same reference numerals are used for the same or equivalent parts as in FIG. 1 and the description thereof is omitted.

In FIG. 5, the vibration gyroscope 20 includes a vibrator base 21 in which a plurality of protrusion portions 21b are provided instead of the plurality of protrusion portions 2c of the vibrator base 2 in the vibration gyroscope 1. In the vibrator base 21, the protrusion portions 21b include a curved portion and a tip portion that extends substantially parallel to the side surface of the vibrator 7, and define a stopper portion for the vibrator 7. Therefore, the protrusion portions 21b have a fixed spring action due to their curved shape in addition to the elasticity provided by their elastic material. Moreover, the same resin material used for the protrusion portions 2d is used for the protrusion portions 21b, and the protrusion portions 21b are integrally formed with the vibrator base 21 by a two-color integral molding method to define a single unitary member as in the case of the vibrator base 2.

In the vibration gyroscope 20, since the protrusion portions 21b of the vibrator base 21 are located in the vicinity of the side surface of the vibrator 7 so as to be substantially parallel to the side surface of the vibrator 7, when the vibrator 7 strikes the protrusion portions 21b due to an external impact, force of the impact between the vibrator 7 and the protrusion portions 21b is reduced by the compressed curved portion of the protrusion portions 21b. Therefore, the possibility of the vibrator 7 being damaged by the protrusion portions 21b is further reduced.

Figure 6:
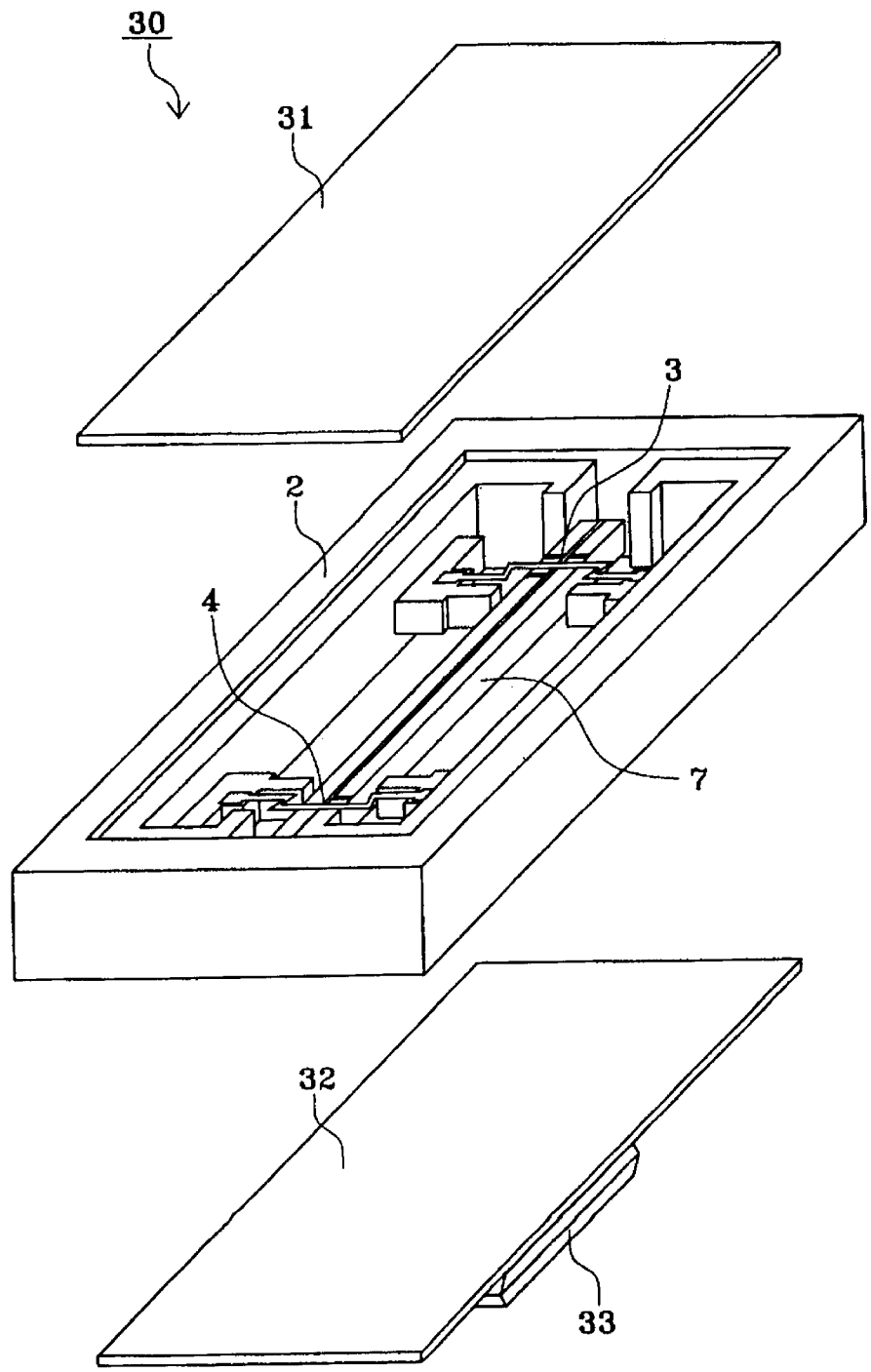
FIG. 6 is an exploded perspective view showing still another preferred embodiment of a vibration gyroscope according to the present invention.

FIG. 6 is an exploded perspective view showing still another preferred embodiment of a vibration gyroscope according to the present invention. In FIG. 6, the same reference numerals are used to indicate the same or equivalent parts as those in FIG. 1 and the description thereof is omitted.

In FIG. 6, the vibration gyroscope 30 includes the vibrator base 2 in which the vibrator 7 is supported in the hollow portion by the supporting members 3 and 4, a case 31 provided in the upper portion of the vibrator base 2, and a circuit board 32 provided in the bottom portion of the vibrator base 2. The vibrator base 2 is sandwiched between the case 31 and the circuit board 32. Moreover, an IC 33 defining a driving circuit and a detection circuit are mounted on the circuit board 32, and the circuit board 32 is provided in the bottom portion of the vibrator base 2 such that the side on which the IC 33 is not mounted faces the vibrator base 2.

In the vibration gyroscope 30, the case 31 and the circuit board 32 are located in the thickness direction (upper and lower direction) of the vibrator 7. Therefore, when the vibrator 7 is displaced in the thickness direction due to an external impact, excessive displacement of the vibrator 7 is prevented by the case 31 and the circuit board 32 which the vibrator 7 strikes. That is, the case 31 and the circuit board 32 function as a second stopper for the vibrator 7. Therefore, plastic deformation of the supporting members 3, 4, 5, and 6 which support the vibrator 7 is effectively prevented, and the vibrator 7 and the supporting members 3 and 4 return to their original state when the impact subsides.

In this way, in the vibration gyroscope 30, plastic deformation of the supporting members 3, 4, 5, and 6 caused by a large impact force is prevented, the damage of the vibrator 7 is prevented, and the durability of the vibration gyroscope 30 to withstand an impact force is greatly improved. Moreover, since the case 31 and the circuit board 32 are utilized as a second stopper, it is not necessary to provide a separate stopper, and accordingly a lower cost and a reduced size is achieved by reducing the number of parts. Furthermore, because the number of parts is reduced, the number of man-hours required for assembly in the manufacturing process and the manufacturing cost are greatly reduced.

Figure 7:
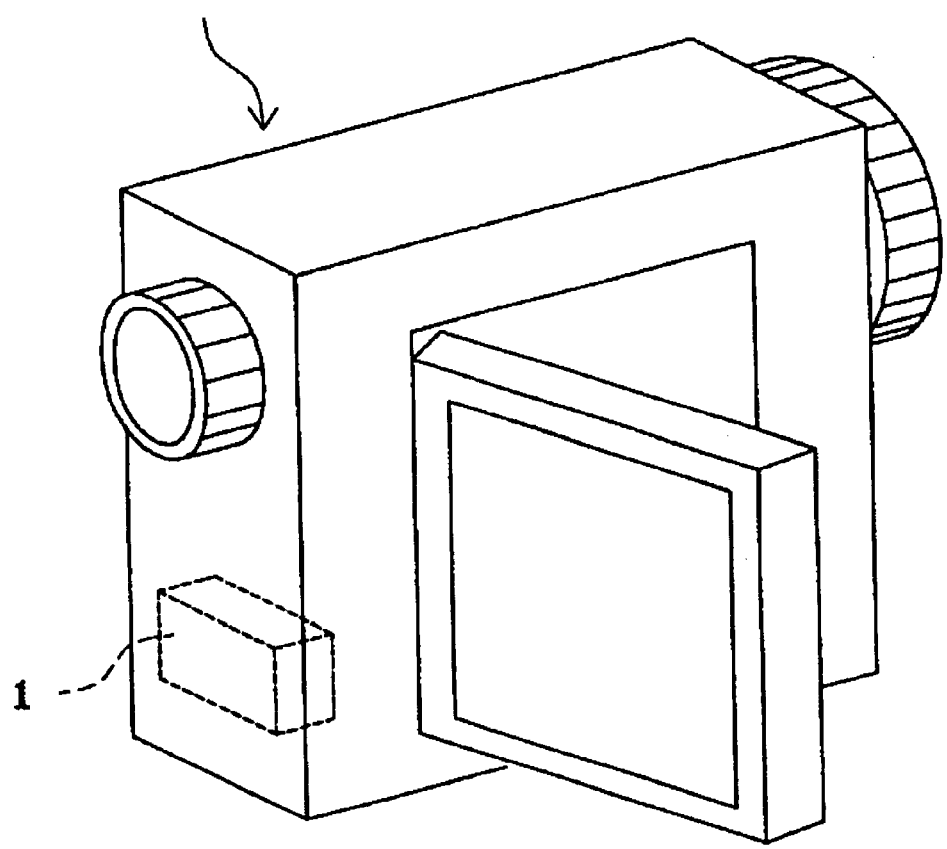
FIG. 7 is a perspective view showing a preferred embodiment of an electronic device according to the present invention.

FIG. 7 is a perspective view showing a video camera as a preferred embodiment of an electronic device according to the present invention. In FIG. 7, the video camera 40 is provided with the vibration gyroscope 1 according to preferred embodiments of the present invention to correct camera movement by hand.

In the video camera 40, since the ability to withstand an impact force is greatly increased in the vibrator 7 of the vibration gyroscope 1, the performance of correcting camera movement is maintained at a very high level.

Moreover, although the vibration gyroscope 1 of preferred embodiments of the present invention is preferably used in the video camera 40, the vibration gyroscope 10, 20, and 30 may be used in the video camera 40.

Furthermore, an electronic device of the present invention is not limited to the video camera and includes all electronic devices using the vibration gyroscope such as a digital camera using the vibration gyroscope for correcting camera movement by hand, a car navigation system for positional detection, and other suitable electronic devices.

In a vibration gyroscope according to the present invention, since a stopper portion for restricting excessive displacement of a vibrator is provided on the inner wall of a vibrator base, plastic deformation of supporting members is prevented and the ability to withstand an impact force is greatly increased. Furthermore, the cost is greatly reduced by reducing the number of parts and the number of man-hours required for assembly.

In particular, plastic deformation of the supporting members is prevented and, at the same time, damage of the vibrator is prevented such that the stopper portion is formed of an elastic material using a two-color integral molding method to provide a single unitary member.

Furthermore, a high performance is maintained for an increased amount of time in an electronic device of various preferred embodiments of the present invention.

While the present invention has been described with reference to what are at present considered to be preferred embodiments, it is to be understood that various changes and modifications may be made thereto without departing from the invention in its broader aspects and therefore, it is intended that the appended claims cover all such changes and modifications that fall within the true spirit and scope of the invention.

What is claimed is:

1. A vibration gyroscope comprising:

a base having a hollow portion;

supporting members fixed to the base; and a vibrator supported by the supporting members in the hollow portion of the base; wherein the base includes a frame portion, and a stopper portion provided on an inner wall of the frame portion so as to limit displacement of the vibrator within a desired distance, and the frame portion and the stopper portion are integral with each other to define a single unitary member.

2. A vibration gyroscope as claimed in claim 1, wherein the stopper portion includes one of a thick wall portion and a protrusion portion provided on the inner wall of the frame portion of the base.

3. A vibration gyroscope as claimed in claim 1, wherein the stopper portion is elastic.

4. A vibration gyroscope as claimed in claim 1, wherein the frame portion and the stopper portion of the base include two integrally molded materials.

5. A vibration gyroscope as claimed in claim 1, further comprising:

sandwiching members arranged above and below the hollow portion of the base, and sandwiching the base;

wherein the sandwiching members include one of a circuit substrate and a case and define a second stopper portion to limit displacement of the vibrator in a thickness direction of the base.

6. A vibration gyroscope as claimed in claim 1, wherein the stopper portion includes a protrusion portion that extends from the inner wall of the frame portion of the base in a direction that is not substantially perpendicular to the inner wall.

7. A vibration gyroscope as claimed in claim 1, wherein the stopper portion includes a protrusion portion that extends from the inner wall of the frame portion of the base and includes a curved portion and an end portion that extend substantially parallel to the inner wall.

8. A vibration gyroscope as claimed in claim 1, wherein the frame portion includes a first resin material and the stopper portion is made of a second resin material that is different from the first resin material.

9. A vibration gyroscope as claimed in claim 8, wherein the second resin material is an elastic material.

10. An electronic device comprising a vibration gyroscope as claimed in claim 1.

11. A vibration gyroscope comprising:

a base having a hollow portion and a frame portion surrounding the hollow portion;

at least two stopper portions provided on at least two inner walls of the frame portion;

at least two fixing portions provided on the at least two inner walls of the frame portion;

at least two supporting members fixed to the at least two fixing portions; and a vibrator supported by the at least two supporting members in the hollow portion of the base; wherein the at least two stopper portions are arranged to limit displacement of the vibrator within a desired distance, and the frame portion and the stopper portion are integral with each other to define a single unitary member.

12. A vibration gyroscope as claimed in claim 11, wherein the at least two stopper portions include one of thick wall portions and protrusion portions provided on the inner wall of the frame portion of the base.

13. A vibration gyroscope as claimed in claim 11, wherein the at least two stopper portions are elastic.

14. A vibration gyroscope as claimed in claim 11, wherein the frame portion and the at least two stopper portions of the base include two integrally molded materials.

15. A vibration gyroscope as claimed in claim 11, further comprising:

sandwiching members arranged above and below the hollow portion of the base, and sandwiching the base;

wherein the sandwiching members include one of a circuit substrate and a case and define a second stopper portion arranged to limit displacement of the vibrator in a thickness direction of the base.

16. A vibration gyroscope as claimed in claim 11, wherein the at least two stopper portions include protrusion portions that extend from the inner wall of the frame portion of the base is a direction that is not substantially perpendicular to the inner wall.

17. A vibration gyroscope as claimed in claim 11, wherein the at least two stopper portions include protrusion portions that extend from the inner wall of the frame portion of the base and include a curved portion and an end portion that extend substantially parallel to the inner wall.

18. A vibration gyroscope as claimed in claim 11, wherein the frame portion is made of a first resin material and the at least two stopper portions are made of a second resin material that is different from the first resin material.

19. A vibration gyroscope as claimed in claim 18, wherein the second resin material is an elastic material.

20. An electronic device comprising a vibration gyroscope as claimed in claim 11.

* * * * *